(12) United States Patent
Song et al.

(10) Patent No.: US 11,264,052 B1
(45) Date of Patent: Mar. 1, 2022

(54) AREA DENSITY CAPACITY IMPROVEMENT WITH NEGATIVE ANISOTROPIC MAGNETIC MATERIAL TRAILING SHIELD NOTCH

(71) Applicant: Western Digital Technologies, Inc., San Jose, CA (US)

(72) Inventors: Suping Song, Fremont, CA (US); Lijie Guan, San Jose, CA (US); Terence Lam, Cupertino, CA (US); Changqing Shi, San Ramon, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/183,190

(22) Filed: Feb. 23, 2021

(51) Int. Cl.
  *G11B 5/31* (2006.01)
  *G11B 5/39* (2006.01)
  *H01F 1/047* (2006.01)

(52) U.S. Cl.
  CPC ............ *G11B 5/315* (2013.01); *G11B 5/3912* (2013.01); *H01F 1/047* (2013.01)

(58) Field of Classification Search
  CPC ........ G11B 5/315; G11B 5/3912; H01F 1/047
  See application file for complete search history.

(56) References Cited

U.S. PATENT DOCUMENTS

| | | | |
|---|---|---|---|
| 7,532,432 B2 | 5/2009 | Ikeda et al. | |
| 7,768,743 B2 | 8/2010 | Guthrie et al. | |
| 8,284,516 B1 | 10/2012 | Tang et al. | |
| 8,472,136 B2 | 6/2013 | Batra et al. | |
| 9,280,992 B1* | 3/2016 | Jiang | H01L 43/08 |
| 9,805,753 B2 | 10/2017 | Ho et al. | |
| 10,014,021 B1* | 7/2018 | Liu | G11B 5/1278 |
| 10,839,831 B1* | 11/2020 | Nguyen | G11B 5/4813 |
| 2007/0230046 A1 | 10/2007 | Le et al. | |
| 2007/0263324 A1 | 11/2007 | Allen et al. | |
| 2008/0278855 A1* | 11/2008 | Guthrie | G11B 5/315 |
| | | | 360/236.5 |

(Continued)

OTHER PUBLICATIONS

Morinaga, Akira et al., "Adjacent track interface analysis of shielded perpendicular writers", Journal of Magnetism and Magnetic Materials, Elsevier, 2008, pp. 2955-2958.

*Primary Examiner* — Brian E Miller
(74) *Attorney, Agent, or Firm* — Patterson & Sheridan, LLP; Steven H. Versteeg (57) ABSTRACT

Embodiments of the present disclosure generally relate to a magnetic recording device comprising a magnetic recording head having a negative anisotropic magnetic (-Ku) material notch. The magnetic recording device comprises a main pole disposed at a media facing surface (MFS), a trailing shield disposed adjacent to the main pole, and a trailing gap disposed between the main pole and the trailing shield. The trailing shield comprises a hot seed layer disposed adjacent to the trailing gap, and a notch comprising a -Ku material in contact with the hot seed layer and the trailing gap. The notch is disposed adjacent to a first surface of the main pole at the MFS. The notch comprising the -Ku material results in an increased effective write magnetic field, an increased down-track field gradient due to reduced shunting from the main pole to the trailing shield, leading to an increased areal density capacity.

20 Claims, 9 Drawing Sheets

(56) References Cited

U.S. PATENT DOCUMENTS

| | | | |
|---|---|---|---|
| 2010/0195247 A1* | 8/2010 | Mochizuki | G11B 5/314 360/123.01 |
| 2013/0083423 A1* | 4/2013 | Shiroishi | G11B 5/607 360/75 |
| 2013/0286505 A1* | 10/2013 | Fukuda | G11B 5/78 360/111 |
| 2018/0330748 A1* | 11/2018 | Liu | G11B 5/3143 |
| 2019/0295572 A1* | 9/2019 | Olson | G11B 5/314 |
| 2020/0342899 A1* | 10/2020 | Olson | G11B 5/66 |

* cited by examiner

AREA DENSITY CAPACITY IMPROVEMENT WITH NEGATIVE ANISOTROPIC MAGNETIC MATERIAL TRAILING SHIELD NOTCH

BACKGROUND OF THE DISCLOSURE

Field of the Disclosure

Embodiments of the present disclosure generally relate to a magnetic recording device comprising a magnetic recording head having a negative anisotropic magnetic (-Ku) material trailing shield notch.

Description of the Related Art

Over the past few years, various magnetic recording methods have been studied to improve the areal density of a magnetic media device, such as a hard disk drive (HDD). For example, a perpendicular magnetic recording (PMR) system records data as magnetizations oriented perpendicular to the plane of a magnetic disk. The magnetic disk has a magnetically soft underlayer covered by a thin magnetically hard top layer. The perpendicular write head has a main pole with a small cross section and a trailing shield (or return pole) having a much larger cross section. A strong, highly concentrated magnetic field emits from the main pole in a direction perpendicular to the magnetic disk surface, magnetizing the magnetically hard top layer. The resulting magnetic flux then travels through the soft underlayer, returning to the trailing shield where the magnetic flux is sufficiently spread out and weak that the magnetic flux will not erase the signal recorded by the main pole when the magnetic flux passes back through the magnetically hard top layer to the trailing shield.

Conventionally, the gap between the main pole and the trailing shield (or a trailing shield hot seed layer that is coupled to the trailing shield) is small, such as between about 20 nanometers (nm) and about 30 nm, in order to increase magnetic field gradients and allow the write head to have a more precise resolution. The gap is typically filled with a non-magnetic electrical insulating material, such as alumina. However, due to the close proximity of the main pole and the trailing shield (or trailing shield hot seed layer), the magnetic flux can shunt from the main pole to the trailing shield (or trailing shield hot seed layer).

Therefore, there is a need in the art for an improved data storage device.

SUMMARY OF THE DISCLOSURE

Embodiments of the present disclosure generally relate to a magnetic recording device comprising a magnetic recording head having a negative anisotropic magnetic (-Ku) material notch. The magnetic recording device comprises a main pole disposed at a media facing surface (MFS), a trailing shield disposed adjacent to the main pole, and a trailing gap disposed between the main pole and the trailing shield. The trailing shield comprises a hot seed layer disposed adjacent to the trailing gap, and a notch comprising a -Ku material in contact with the hot seed layer and the trailing gap. The notch is disposed adjacent to a first surface of the main pole at the MFS. The notch comprising the -Ku material results in the magnetic recording having an increased effective write magnetic field, an increased down- track field gradient due to reduced shunting from the main pole to the trailing shield, leading to an increased areal density capacity (ADC).

In one embodiment, a magnetic recording head comprises a main pole disposed at a media facing surface, a trailing gap disposed adjacent to and in contact with a first surface of the main pole, a notch disposed adjacent to and in contact with the trailing gap at the media facing surface, the notch comprising a negative anisotropic magnetic material, wherein the notch is substantially aligned with the first surface of the main pole at the media facing surface, and a trailing shield coupled to the notch.

In another embodiment, a magnetic recording head comprises a trailing shield disposed at a media facing surface, the trailing shield comprising a hot seed layer, a notch coupled to the hot seed layer at the media facing surface, the notch comprising a negative anisotropic magnetic material having a saturation magnetization between about 2.0 T to about 2.5 T, and a uniaxial anisotropy between about -0.5 T to about -1.5 T, a trailing gap disposed adjacent to the notch, the trailing gap surround a first surface, a second surface, and a third surface of the notch, and a main pole disposed adjacent to the trailing gap.

In yet another embodiment, a magnetic recording head comprises a leading shield, a main pole having a first surface disposed at a media facing surface, the main pole comprising a leading side taper recessed a first distance from the media facing surface and a trailing side taper recessed a second distance from the media facing surface, a trailing gap disposed adjacent to the main pole and the trailing side taper, a notch disposed adjacent to the trailing gap, the notch comprising a negative anisotropic magnetic material, wherein the notch has a first surface disposed at the media facing surface, and a trailing shield comprising a hot seed layer, the hot seed layer being coupled to the notch.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to a magnetic recording device comprising a magnetic recording head having a negative anisotropic magnetic (-Ku) material notch. The magnetic recording device comprises a main pole disposed at a media facing surface (MFS), a trailing shield disposed adjacent to the main pole, and a trailing gap disposed between the main pole and the trailing shield. The trailing shield comprises a hot seed layer disposed adjacent to the trailing gap, and a notch comprising a -Ku material in contact with the hot seed layer and the trailing gap. The notch is disposed adjacent to a first surface of the main pole at the MFS. The notch comprising the -Ku material results in the magnetic recording having an increased effective write magnetic field, an increased downtrack field gradient due to reduced shunting from the main pole to the trailing shield, leading to an increased ADC.

Figure 1:
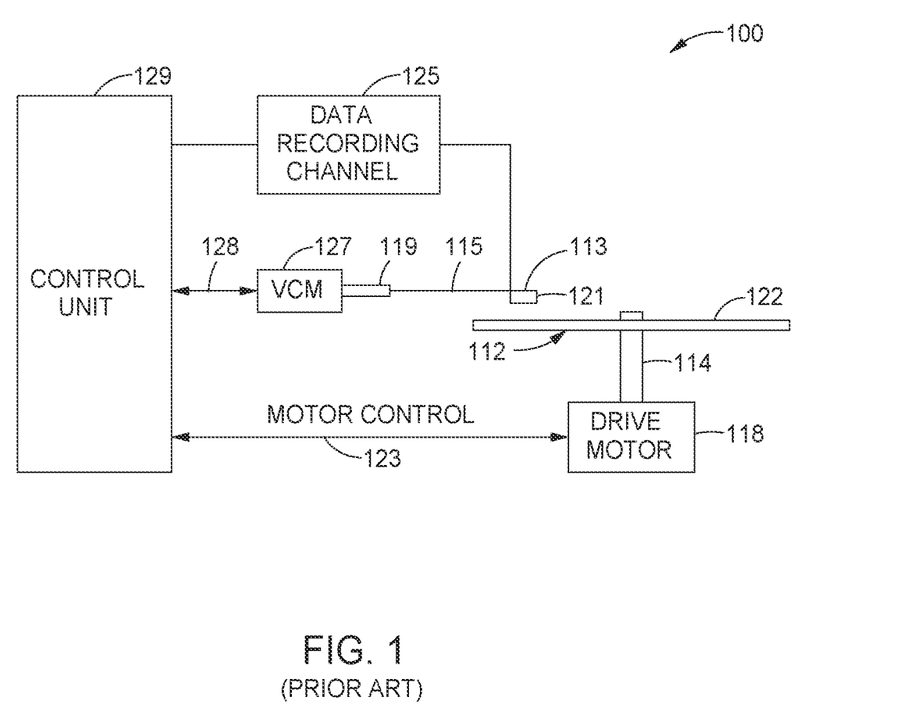
FIG. 1 illustrates a magnetic recording device embodying this disclosure.

FIG. 1 illustrates a magnetic recording device 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic recording device 100, the rotation of the magnetic media 112 generates an air bearing between the slider 113 and the media surface 122 which exerts an upward force or lift on the slider 113. The air bearing thus counter-balances the slight spring force of suspension 115 and supports slider 113 off and slightly above the media 112 surface by a small, substantially constant spacing during normal operation. In the case of EAMR, a DC magnetic field generated from an assist element of the magnetic head assembly 121 enhances the write-ability so that the write element of the magnetic head assembly 121 may efficiently magnetize the data bits in the media 112.

The various components of the magnetic recording device 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

It is to be understood that the embodiments discussed herein are applicable to a data storage device such as a hard disk drive (HDD) as well as a tape drive such as a tape embedded drive (TED) or an insertable tape media drive such as those made according to Linear Tape Open (LTO) standards. An example TED is described in co-pending patent application titled "Tape Embedded Drive," United States Publication. No. 2020/0258544, filed Mar. 26, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 2:
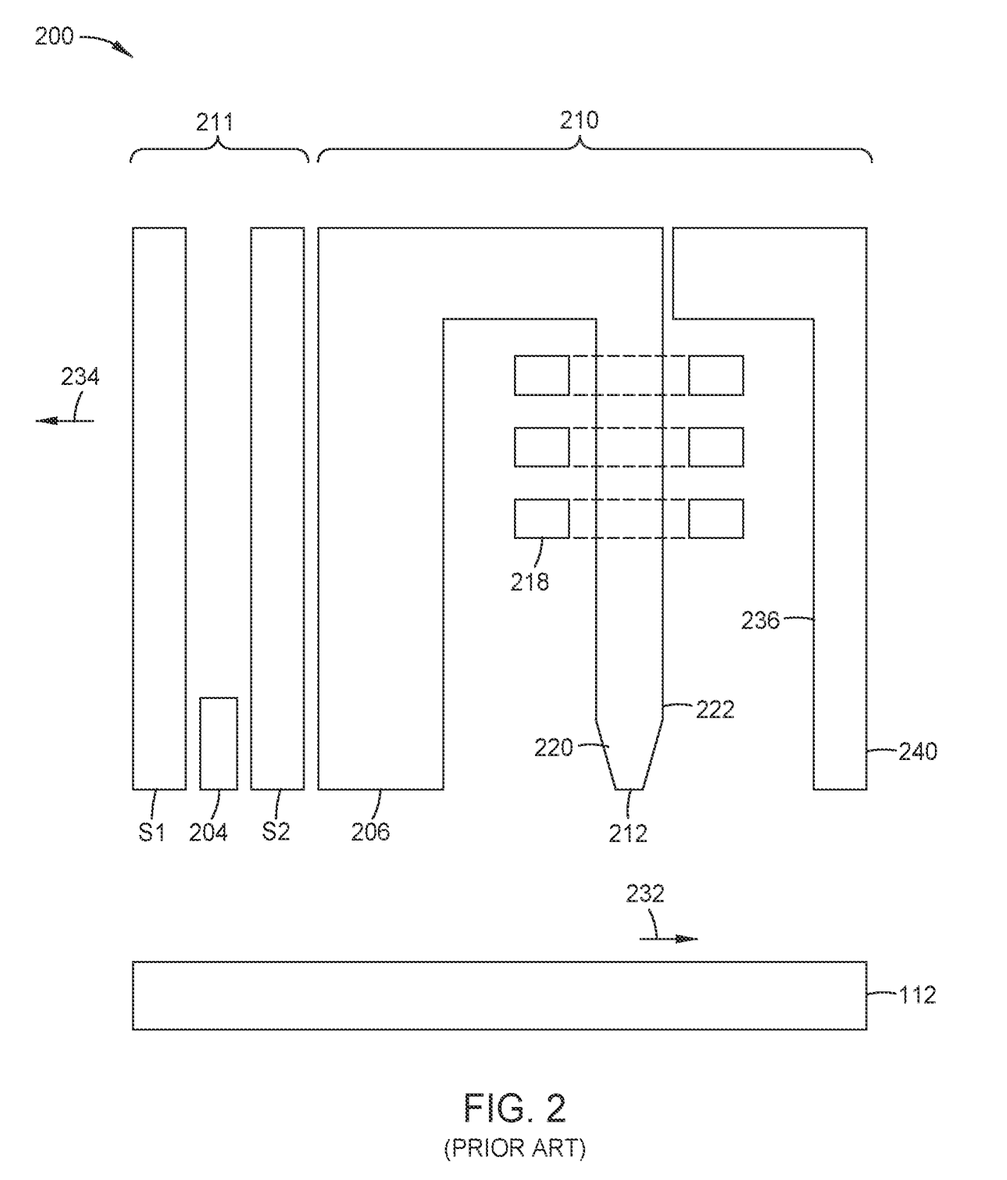
FIG. 2 is a fragmented, cross sectional side view through the center of a read/write head facing the magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR)

head. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as an FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The main pole 220 may comprise ferromagnetic materials, typically alloys of one or more of Co, Fe and Ni. The trailing shield 240 may be a magnetic material such as NiFe alloy. In one embodiment, the trailing shield 240 has an Ms of about 1.2 T to about 1.6 T.

Figure 3A:
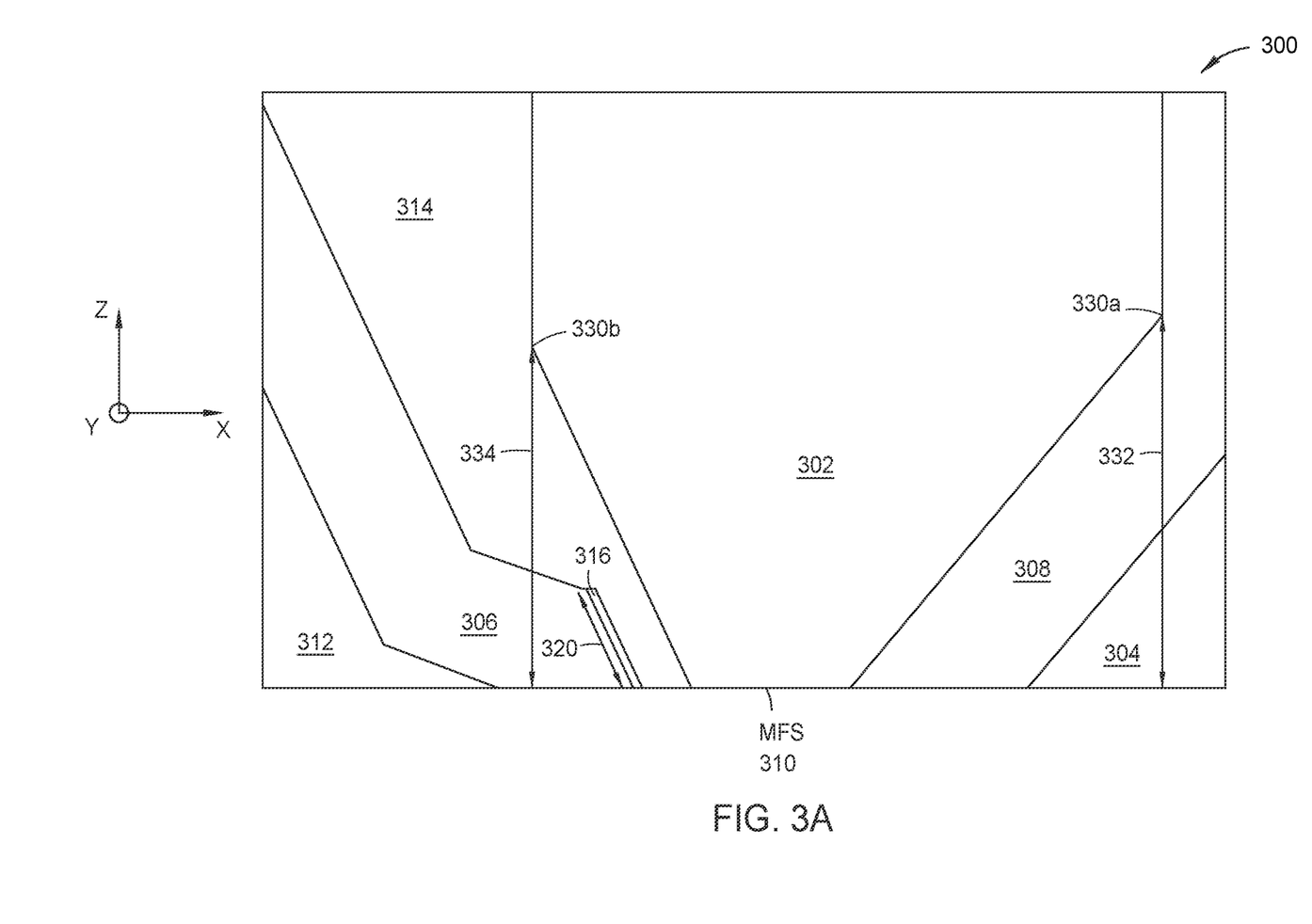
FIGS. 3A-3B illustrate a write head comprising a negative anisotropic magnetic (-Ku) notch, according to various embodiments.
Figure 3B:
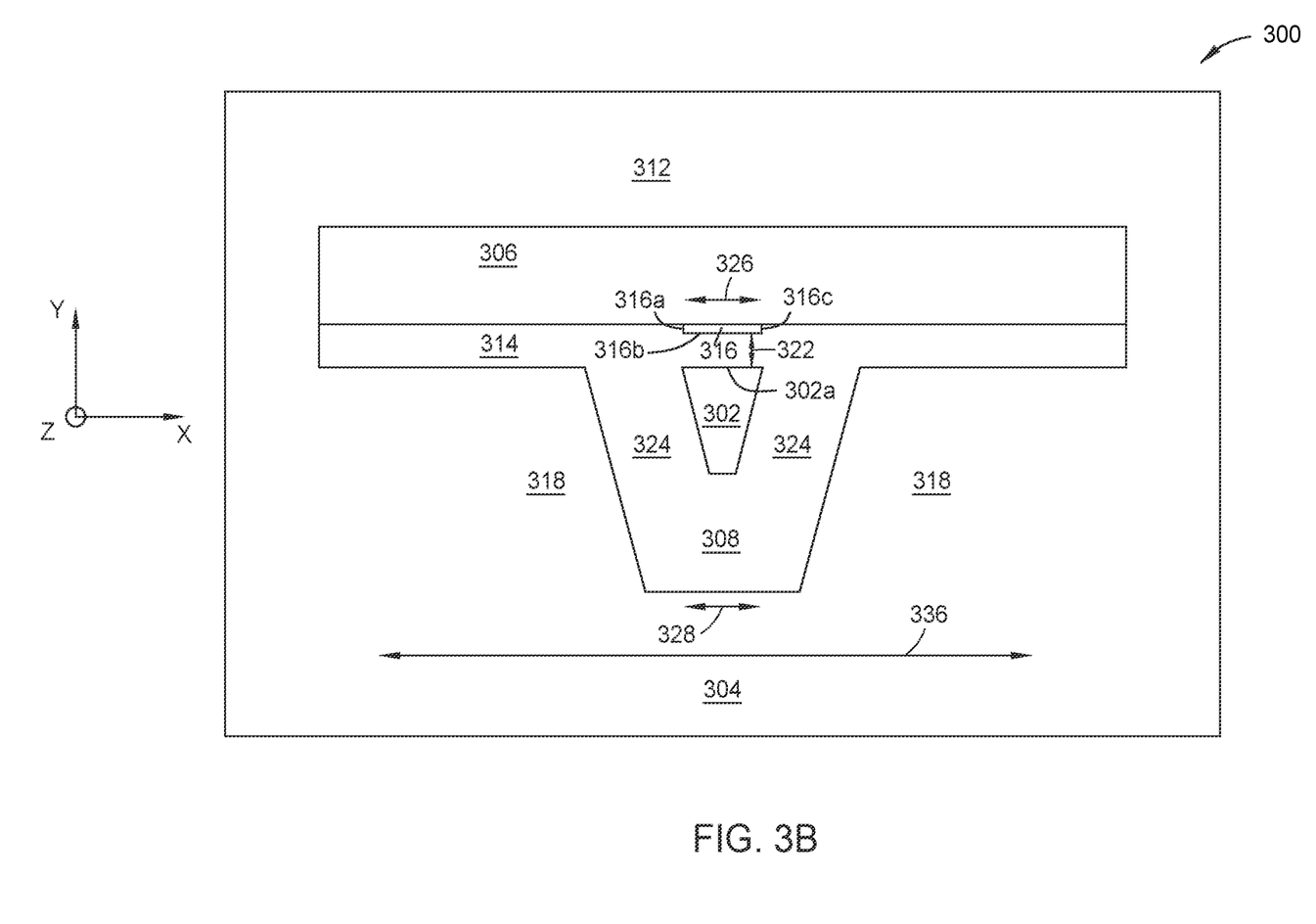

FIGS. 3A-3B illustrate a magnetic recording head 300 comprising a negative anisotropic magnetic (−Ku) notch, according to various embodiments. FIG. 3A illustrates a cross-section view of the magnetic recording head 300, and FIG. 3B illustrates a MFS view of the magnetic recording head 300. The magnetic recording head 300 may be the write head 210 of FIG. 2. The magnetic recording head 300 is within a magnetic recording device, such as the magnetic recording device 100 of FIG. 1.

The magnetic recording head 300 comprises a main pole 302 disposed between a leading shield 304 and a trailing shield 312. The trailing shield 312 comprises a hot seed layer 306 disposed adjacent to the main pole 302. A leading gap 308 is disposed between the main pole 302 and the leading shield 304, and a trailing gap 314 is disposed between the hot seed layer 306 and the main pole 302. The leading gap 308 and the trailing gap 314 may each individually comprise a non-magnetic electrically insulating material, such as alumina. The main pole 302 comprises a leading side taper 330a extending a first distance 332 from the MFS 310 and a trailing side taper 330b extending a second distance 334 from the MFS 310. In some embodiments, the first distance 332 is greater than the second distance 334.

As shown in FIG. 3B, side shields 318 are disposed adjacent to the leading shield 304 and the main pole 302. Side gaps 324 are disposed between the main pole 302 and the side shields 318. The side gaps 324 may comprise a non-magnetic electrically insulating material, such as alumina. The side gaps 324 are disposed in contact with the leading gap 308 and the trailing gap 314. In some embodiments, a width 336 of the hot seed layer 306 is greater than a width 328 of the first surface 302a of the main pole 302 at the MFS.

The trailing shield 312 further comprises a notch 316 disposed on the hot seed layer 306 adjacent to the trailing gap 314 at the MFS 310. The notch 316 is substantially aligned with the first surface 302a of the main pole 302 in the y-direction at the MFS 310. At least three surfaces 316a, 316b, 316c of the notch 316 are surrounded by and in contact with the trailing gap 314 at the MFS 310. The notch 316 comprises a negative anisotropic magnetic (−Ku) material, such as CoFe or Coir, and may be a CoFe multilayer structure, as discussed below in FIG. 3C. The −Ku material of the notch 316 has a saturation magnetization (Ms) between about 2 T to about 2.5 T, such as about 2.2 T, and a uniaxial anisotropy (Hk) between about −0.5 T to about −1.5 T, such as about −1 T. The notch 316 has a depth or thickness 320 in the z-direction of about 2 nm to about 16 nm, as shown in FIG. 3A. In some embodiments, the hot seed layer 306 has the same thickness in the z-direction as the notch 316. The thickness 320 of the notch 316 is less than the second distance 334 of the trailing side taper 330b of the main pole 302.

The notch 316 further has a width 326 in the x-direction between about 20 nm to about 100 nm, as shown in FIG. 3B. In some embodiments, the width 326 of the notch 316 is about the same as a width 328 of a first surface 302a of the main pole 302 disposed adjacent to the trailing gap 314. In other embodiments, the width 326 of the notch 316 is greater than or smaller than the width 328 of the first surface 302a. The width 326 of the notch 316 at the MFS is less than the width 336 of the hot seed layer 306. The notch 316 is spaced from the first surface 302a of the main pole 302 a distance 322 in the y-direction of about 15 nm to about 25 nm.

Figure 3C:
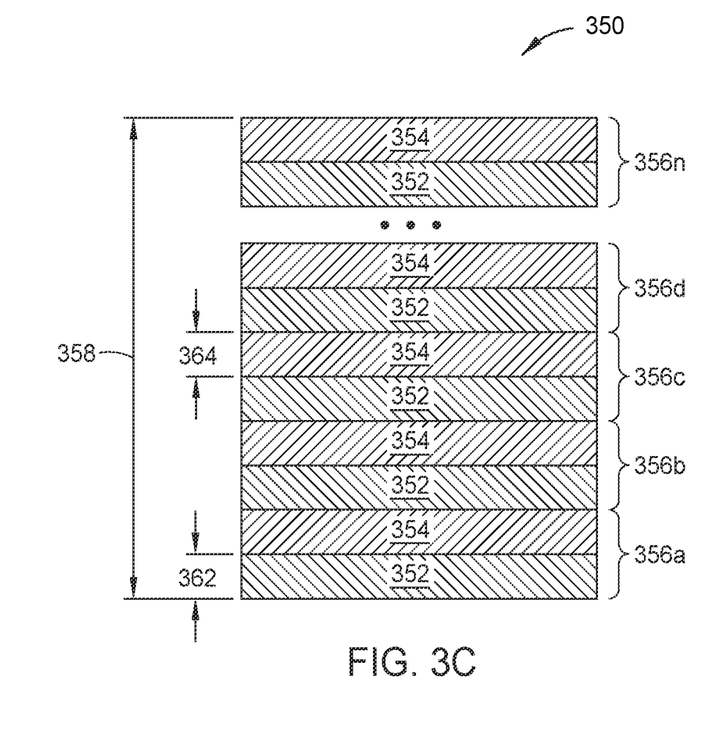
FIG. 3C illustrates a schematic of a -Ku CoFe multilayer structure, according to various embodiments.

FIG. 3C illustrates a schematic of a −Ku CoFe multilayer structure 350, according to various embodiments. The −Ku CoFe multilayer structure 350 may be used as the notch 316 of FIG. 3A-3B. The multilayer structure 350 comprises a plurality of Co layers 352 and a plurality of Fe layers 354. The Co layers 352 and the Fe layers 354 within the multilayer structure 350 are alternating. One Co layer 352 and one Fe layer 354 together form a CoFe layer 356a. The multilayer structure 350 comprises a plurality of CoFe layers 356a-356n.

Each Co layer 352 has a same thickness 362 between about 0.2 nm to about 0.6 nm, and each Fe layer 354 has a same thickness 364 between about 0.4 nm to about 0.8 nm. The thickness 362 of the Co layers 352 may be the same as the thickness 364 of the Fe layers 354, or the thickness 362 of the Co layers 352 may be different from the thickness 364 of the Fe layers 354, as shown in Table 1 below. The multilayer structure 350 has a total thickness of 358 of about 40 angstroms to about 100 angstroms. Table 1 shows various combinations of Co layer 352 thicknesses 362 and Fe layer 354 thicknesses 364 that may be used for the multilayer structure 350.

TABLE 1

| Co/Fe layer thicknesses (nm) | Number of stacked Co/Fe layers | Thickness (Angstroms) | Bs (Tesla) | (Hk) (Tesla) |
| --- | --- | --- | --- | --- |
| Co 0.5/Fe 0.5 | 5 | 50 | 2.06 | −0.68 |
| Co 0.5/Fe 0.5 | 8 | 80 | 2.15 | −0.81 |
| Co 0.4/Fe 0.6 | 5 | 50 | 2.12 | −0.64 |
| Co 0.4/Fe 0.6 | 8 | 80 | 2.21 | −0.80 |

TABLE 1-continued

| Co/Fe layer thicknesses (nm) | Number of stacked Co/Fe layers | Thickness (Angstroms) | Bs (Tesla) | (Hk) (Tesla) |
|---|---|---|---|---|
| Co 0.3/Fe 0.7 | 5 | 50 | 2.16 | −0.57 |
| Co 0.3/Fe 0.7 | 8 | 80 | 2.24 | −0.66 |

For example, in some embodiments, each Co layer 352 may have a thickness 362 of about 0.5 nm, and each Fe layer 354 may have a thickness 364 of about 0.5 nm. The multilayer structure 350 may have 5 CoFe layers 356a-356n or 8 CoFe layers 356a-356n, resulting in the multilayer structure 350 having a total thickness of about 50 angstroms or about 80 angstroms, respectively. In such an embodiment, the multilayer structure 350 has a Bs of about 2.06 T to about 2.15 T, and an Hk of about −0.68 to about −0.84.

In other embodiments, each Co layer 352 may have a thickness 362 of about 0.4 nm, and each Fe layer 354 may have a thickness 364 of about 0.6 nm. The multilayer structure 350 may have 5 CoFe layers 356a-356n or 8 CoFe layers 356a-356n, resulting in the multilayer structure 350 having a total thickness of about 50 angstroms or about 80 angstroms, respectively. In such an embodiment, the multilayer structure 350 has a Bs of about 2.12 T to about 2.21 T, and an Hk of about −0.64 T to about −0.80 T.

In yet other embodiments, each Co layer 352 may have a thickness 362 of about 0.3 nm, and each Fe layer 354 may have a thickness 364 of about 0.7 nm. The multilayer structure 350 may have 5 CoFe layers 356a-356n or 8 CoFe layers 356a-356n, resulting in the multilayer structure 350 having a total thickness of about 50 angstroms or about 80 angstroms, respectively. In such an embodiment, the multilayer structure 350 has a Bs of about 2.16 T to about 2.24 T, and an Hk of about −0.57 to about −0.66.

Figure 4A:
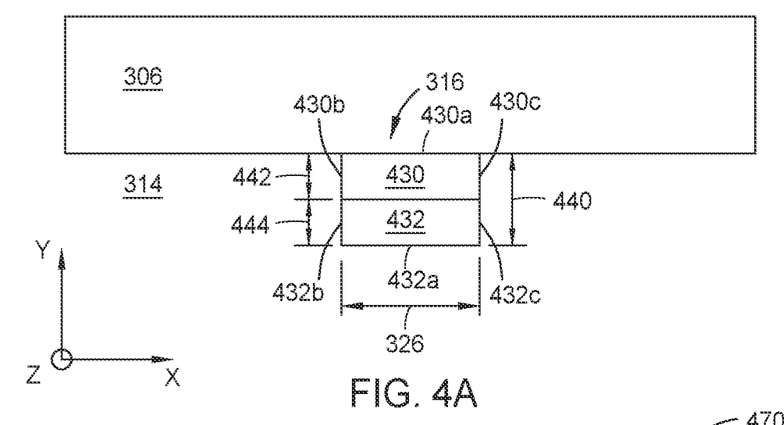
FIGS. 4A-4C illustrate MFS views of magnetic recording heads comprising the notch of FIGS. 3A-3B, according to various embodiments.
Figure 4B:
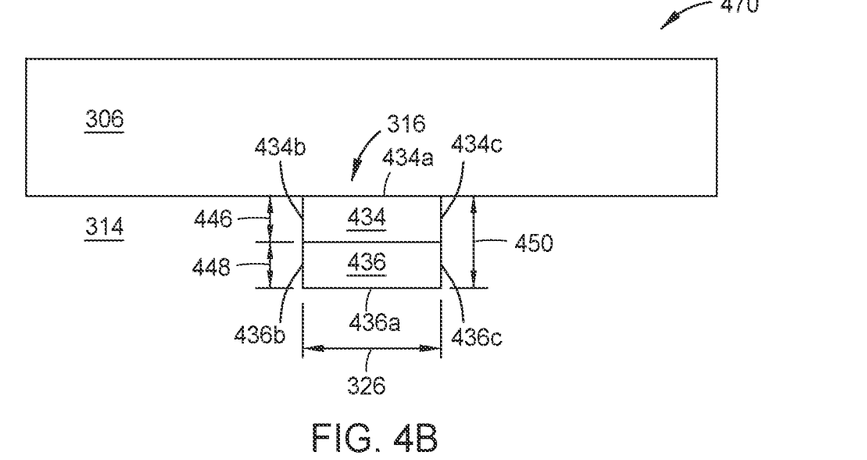
Figure 4C:
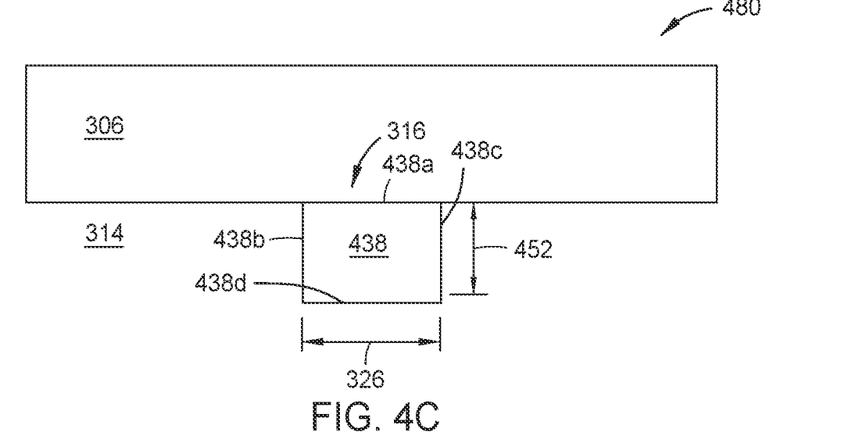

FIGS. 4A-4C illustrate MFS views of magnetic recording heads 400, 470, 480, respectively, comprising the notch 316 of FIGS. 3A-3B, according to various embodiments. The notch 316 may comprise the multilayer structure 350 of FIG. 3C. The magnetic recording heads 400, 470, 480 of FIGS. 4A-4C, respectively, may be the write head 210 of FIG. 2, or the magnetic recording head 300 of FIGS. 3A-3B.

In the magnetic recording head 400 of FIG. 4A, the notch 316 comprises a first layer 430 disposed on the hot seed layer 306 and a second layer 432 disposed on the first layer 430. The first layer 430 comprises a −Ku material, such as the CoFe multilayer 350, and has a first length 442 in the y-direction of about 2 nm to about 12 nm. The second layer 432 comprises CoFe and has a second length 444 in the y-direction of about 2 nm to about 8 nm. The first length 442 and the second length 444 may be the same, or the first length 442 and the second length 444 may be different. The notch 316 of the magnetic recording head 400 may have a total length 440 in the y-direction of about 2 nm to about 16 nm, and a width 326 in the x-direction between about 20 nm to about 100 nm. The first layer 430 comprises a first surface 430a disposed in contact with the hot seed layer 306, and second and third surfaces 430b, 430c disposed in contact with the trailing gap 314. The second layer 432 comprises first, second, and third surfaces 432a, 432b, 432c disposed in contact with the trailing gap 314. The first surface 432a of the second layer 432 is disposed adjacent to the first surface 302a of the main pole 302.

In the magnetic recording head 470 of FIG. 4B, the notch 316 comprises a first layer 434 disposed on the hot seed layer 306 and a second layer 436 disposed on the first layer 434. The first layer 434 comprises CoFe and has a first length 446 in the y-direction of about 2 nm to about 8 nm. The second layer 436 comprises a −Ku material, such as the CoFe multilayer 350, and has a second length 448 in the y-direction of about 2 nm to about 12 nm. The first length 446 and the second length 448 may be the same, or the first length 446 and the second length 448 may be different. The notch 316 of the write magnetic recording head 470 may have a total length 450 in the y-direction of about 2 nm to about 16 nm, and a width 326 in the x-direction between about 20 nm to about 100 nm. The first layer 434 comprises a first surface 434a disposed in contact with the hot seed layer 306, and second and third surfaces 434b, 434c disposed in contact with the trailing gap 314. The second layer 436 comprises first, second, and third surfaces 436a, 436b, 436c disposed in contact with the trailing gap 314. The first surface 436a of the second layer 436 is disposed adjacent to the first surface 302a of the main pole 302.

In the magnetic recording head 480 of FIG. 4C, the notch 316 comprises a first layer 438 disposed on the hot seed layer 306. The first layer 438 comprises a −Ku material, such as the CoFe multilayer 350, and has a length 452 in the y-direction of about 2 nm to about 16 nm. The notch 316 of the magnetic recording head 480 may have a total length 452 in the y-direction of about 2 nm to about 16 nm, and a width 326 in the x-direction between about 20 nm to about 100 nm. The first layer 438 comprises a first surface 438a disposed in contact with the hot seed layer 306, and second, third, and fourth surfaces 438b, 438c, 438d disposed in contact with the trailing gap 314. The fourth surface 438d of the first layer 438 is disposed adjacent to the first surface 302a of the main pole 302.

Figure 5:
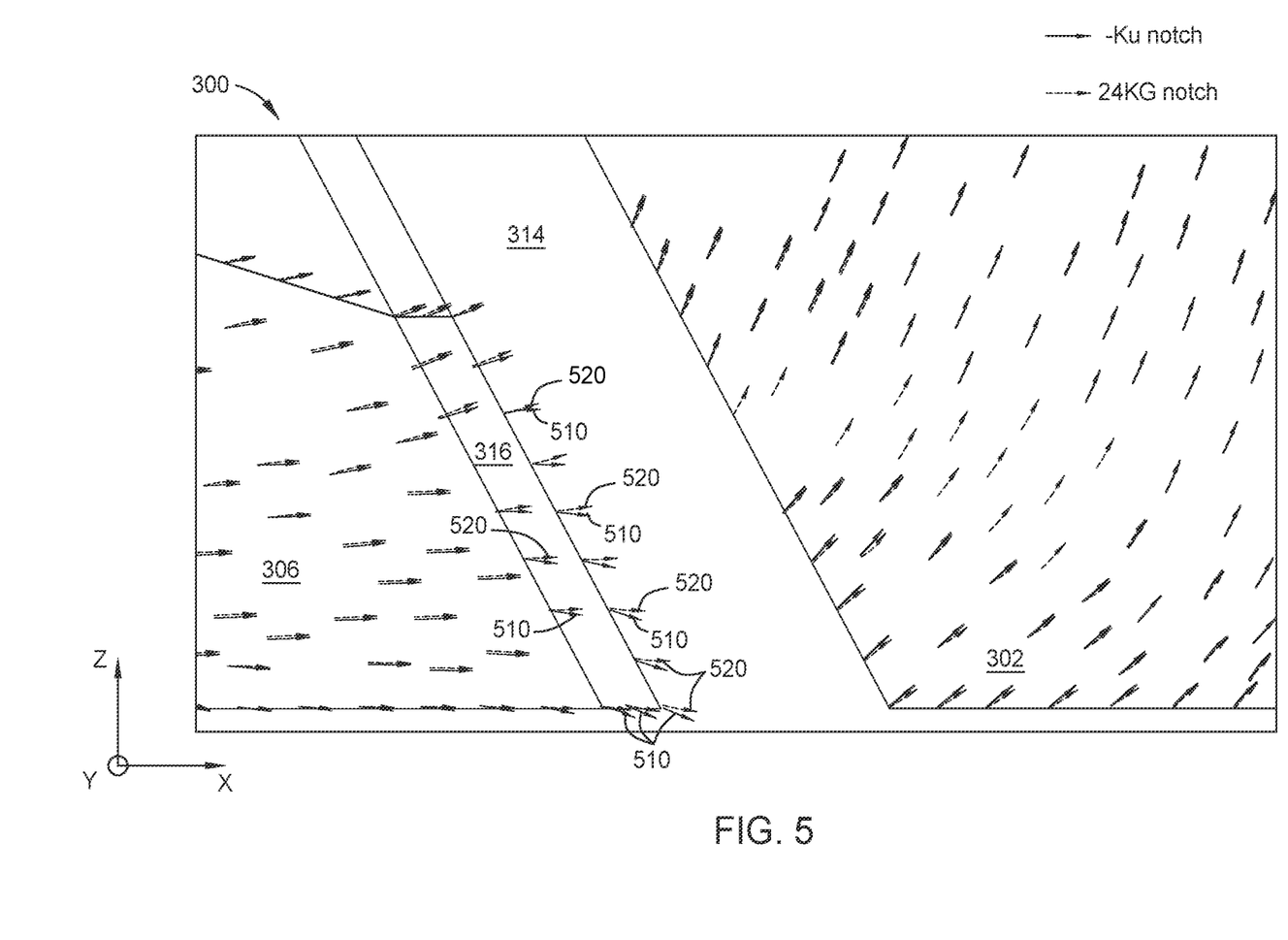
FIG. 5 illustrates the magnetization of the notch of the magnetic recording head of FIGS. 3A-3B when writing to a media, according to one embodiment.

FIG. 5 illustrates the magnetization 510 of the notch 316 of the magnetic recording head 300 of FIGS. 3A-3B when writing to a media (not shown), according to one embodiment. In FIG. 5, magnetization arrows 510 represent the magnetization direction of the notch 316 comprising a −Ku material such as the multilayer structure 350 of FIG. 3C (referred to as a −Ku notch 316) while magnetization arrows 520 represent the magnetization direction of a conventional CoFe notch comprising a material having a Bs of 24 KG and a −Ku of 0 T, or no negative anisotropic magnetism. As shown in FIG. 5, the magnetization 510 of the −Ku material notch 316 favors an in-plane rotation when writing to a media, whereas the magnetization 520 of the conventional CoFe notch is less favorable to an in-plane rotation when writing to a media. As such, the −Ku material notch 316 has a larger effective write magnetic field (Heff) with less trailing gap shunting, and a larger down-track field gradient (Hgrad) than the conventional CoFe notch.

Figure 6:
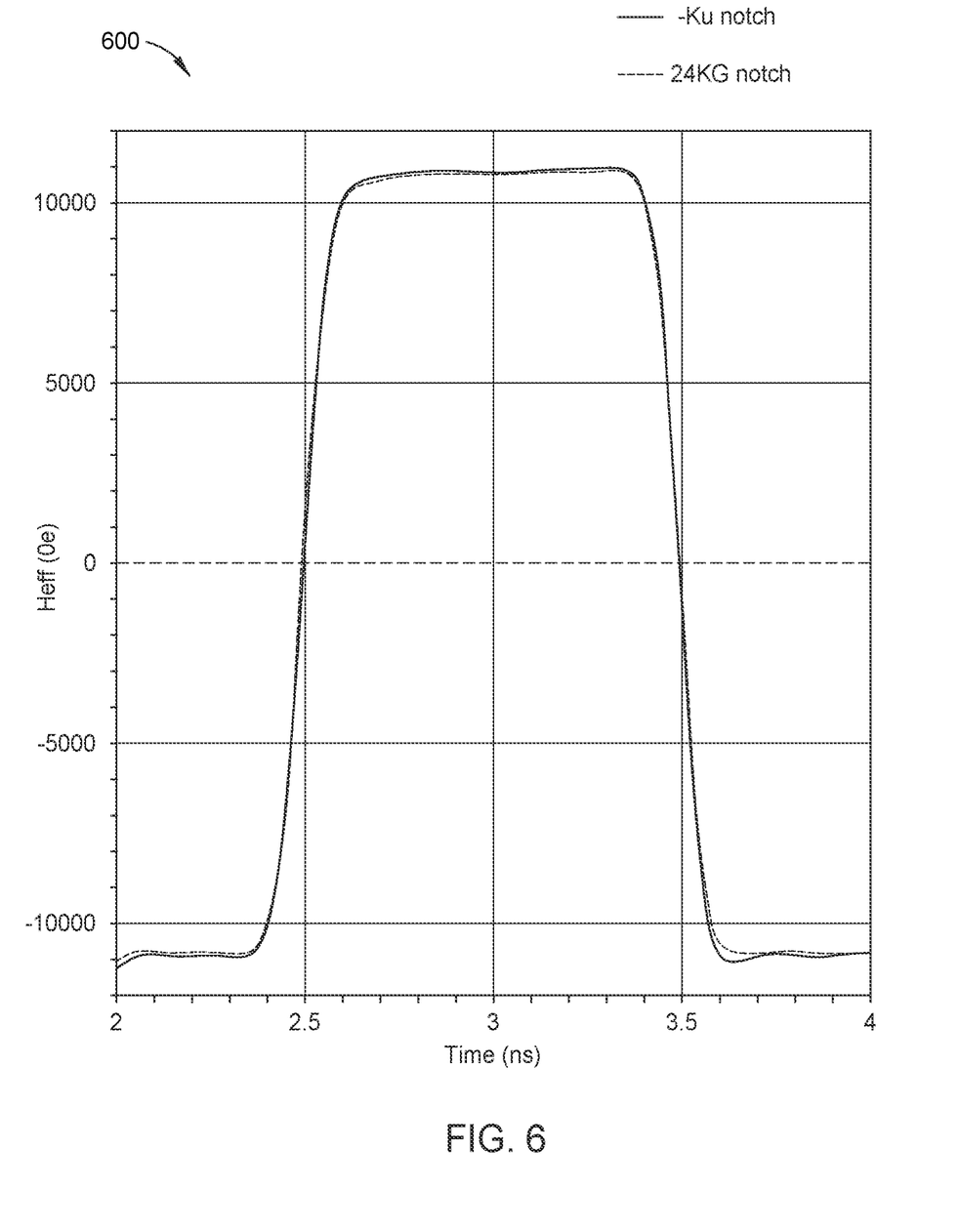
FIG. 6 illustrates a graph illustrating Heff in Oe versus time in ns for the magnetic recording head of FIGS. 3A-3B and a conventional magnetic recording head, according to one embodiment.

FIG. 6 illustrates a graph 600 illustrating Heff in Oe versus the amount of time in ns a write current as been applied for both the −Ku notch 316 of the magnetic recording head 300 of FIGS. 3A-3B and a conventional 24 KG CoFe notch (i.e., a CoFe notch having a −Ku of 0 T, or no negative anisotropic magnetism) of a conventional magnetic recording head, according to one embodiment. As shown in the graph 600, the −Ku notch 316 has a Heff of about 10875 Oe after the write current has been applied to the magnetic recording head for about 2.7 ns to about 3.4 ns while the 24 KG notch has a Heff of about 10770 Oe after the write current has been applied to the magnetic recording head for about 2.7 ns to about 3.4 ns. Thus, the −Ku notch 316 achieves a larger Heff than the conventional 24 KG CoFe notch, resulting in less shunting from the main pole 302 to the trailing shield 312.

Figure 7:
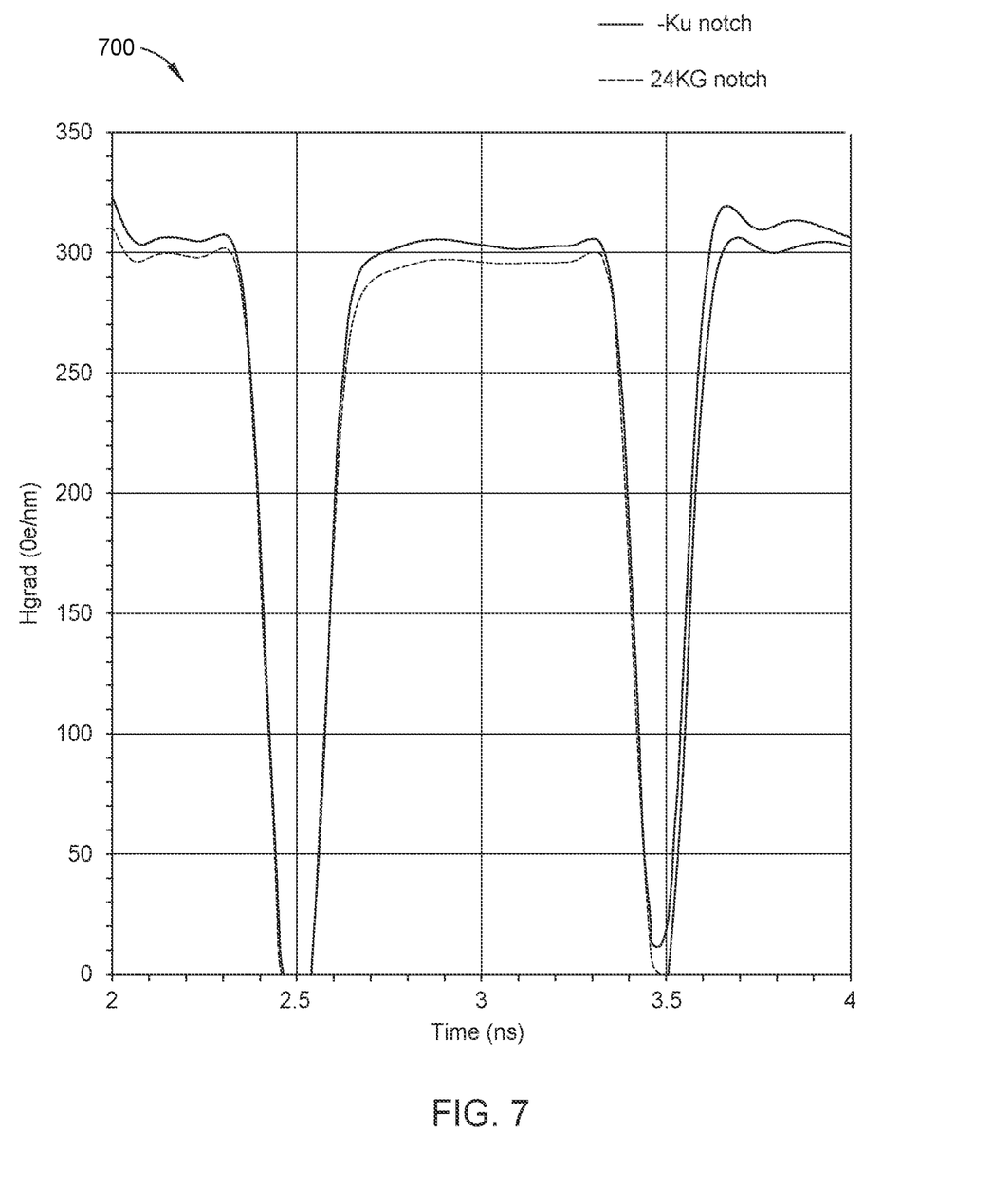
FIG. 7 illustrates a graph illustrating Hgrad in Oe/nm versus time in ns for the magnetic recording head of FIGS. 3A-3B and a conventional magnetic recording head, according to one embodiment.

FIG. 7 illustrates a graph 700 illustrating Hgrad in Oe/nm versus the amount of time in ns a write current as been applied for both the −Ku notch 316 of the magnetic recording head 300 of FIGS. 3A-3B and a conventional 24 KG CoFe notch (i.e., a CoFe notch having a −Ku of 0 T, or no negative anisotropic magnetism) of a conventional magnetic recording head, according to one embodiment. As shown in the graph 700, the −Ku notch 316 has a Hgrad of about 303 Oe/nm after the write current has been applied to the magnetic recording head for about 2.6 ns to about 3.4 ns while the conventional 24 KG CoFe notch has a Hgrad of about 290 Oe/nm after the write current has been applied to the magnetic recording head for about 2.6 ns to about 3.4 ns. Thus, the −Ku notch 316 achieves a larger Hgrad than the conventional 24 KG CoFe notch, resulting in an increased areal density capacity (ADC) of the magnetic recording head 300.

Thus, a magnetic recording device having a magnetic recording head comprising a −Ku notch disposed on the trailing shield hot seed layer has an increased effective write magnetic field, an increased down-track field gradient due to reduced shunting from the main pole to the trailing shield, leading to an increased ADC. As such, the magnetic recording head comprising the −Ku notch has a higher bits per inch (BPI) writing capability than conventional write heads, resulting in an better-quality and more effective write head.

In one embodiment, a magnetic recording head comprises a main pole disposed at a media facing surface, a trailing gap disposed adjacent to and in contact with a first surface of the main pole, a notch disposed adjacent to and in contact with the trailing gap at the media facing surface, the notch comprising a negative anisotropic magnetic material, wherein the notch is substantially aligned with the first surface of the main pole at the media facing surface, and a trailing shield coupled to the notch.

The notch has a width at the media facing surface of about 20 nm to about 100 nm and a thickness extending from the media facing surface into the magnetic recording head of about 2 nm to about 16 nm. The notch is spaced a distance of about 15 nm to about 25 nm from the first surface of the main pole. The −Ku material is a CoFe multilayer structure having a saturation magnetization of about 2.2 T and a uniaxial anisotropy between about −0.5 T and about −1 T. The notch comprises a first layer of the −Ku material and a second layer of CoFe. The first layer of the −Ku material is disposed in contact with the trailing gap and the second layer of CoFe is disposed adjacent to the first surface of the main pole. The first layer of the −Ku material is disposed in contact with the trailing shield and the second layer of CoFe is disposed adjacent to the first surface of the main pole.

In another embodiment, a magnetic recording head comprises a trailing shield disposed at a media facing surface, the trailing shield comprising a hot seed layer, a notch coupled to the hot seed layer at the media facing surface, the notch comprising a negative anisotropic magnetic material having a saturation magnetization between about 2.0 T to about 2.5 T, and a uniaxial anisotropy between about −0.5 T to about −1.5 T, a trailing gap disposed adjacent to the notch, the trailing gap surround a first surface, a second surface, and a third surface of the notch, and a main pole disposed adjacent to the trailing gap.

The notch has a first width at the media facing surface less than a second width of the hot seed layer at the media facing surface, the first width of the notch being about 20 nm to about 100 nm. The −Ku material is a CoFe multilayer structure comprising alternating layers of Co layers having a thickness between about 0.2 nm about 0.6 nm and Fe layers having a thickness between about 0.4 nm to about 0.8 nm. The notch is a multi-layer structure comprising a first layer of the −Ku material and a second layer of CoFe. The notch has a first thickness extending from the media facing surface into the magnetic recording head of about 2 nm to about 16 nm. The hot seed layer has a second thickness extending from the media facing surface into the magnetic recording head substantially equal to the first thickness of the notch.

In yet another embodiment, a magnetic recording head comprises a leading shield, a main pole having a first surface disposed at a media facing surface, the main pole comprising a leading side taper recessed a first distance from the media facing surface and a trailing side taper recessed a second distance from the media facing surface, a trailing gap disposed adjacent to the main pole and the trailing side taper, a notch disposed adjacent to the trailing gap, the notch comprising a negative anisotropic magnetic material, wherein the notch has a first surface disposed at the media facing surface, and a trailing shield comprising a hot seed layer, the hot seed layer being coupled to the notch.

The notch has a first thickness extending from the media facing surface into the magnetic recording head, the first thickness of the notch being less than the second distance the trailing side taper is recessed from the media facing surface. The hot seed layer has a second thickness extending from the media facing surface into the magnetic recording head, the first thickness of the notch being substantially equal to the second thickness of the hot seed layer. The notch has a first width at the media facing surface of about 20 nm to about 100 nm. The notch is spaced a distance of about 15 nm to about 25 nm from the first surface of the main pole. The notch is substantially aligned with the first surface of the main pole and the media facing surface. The first surface of the main pole has a second width substantially equal to the first width of the notch.

The notch comprises a first layer of the −Ku material coupled to the hot seed layer and a second layer of CoFe disposed adjacent to the first surface of the main pole, the −Ku material having a saturation magnetization between about 2.0 T to about 2.5 T, and a uniaxial anisotropy between about −0.5 T to about −1.5 T The notch comprises a first layer of the −Ku material disposed adjacent to the first surface of the main pole and a second layer of CoFe coupled to the hot seed layer, the −Ku material having a saturation magnetization between about 2.0 T to about 2.5 T, and a uniaxial anisotropy between about −0.5 T to about −1.5 T.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole disposed at a media facing surface;
   a trailing gap disposed adjacent to and in contact with a first surface of the main pole;
   a notch disposed adjacent to and in contact with the trailing gap at the media facing surface, the notch comprising a negative anisotropic magnetic (−Ku) material, wherein the notch is substantially aligned with the first surface of the main pole at the media facing surface; and
   a trailing shield coupled to the notch.

2. The magnetic recording head of claim 1, wherein the notch has a width at the media facing surface of about 20 nm to about 100 nm and a thickness extending from the media facing surface into the magnetic recording head of about 2 nm to about 16 nm, and wherein the notch is spaced a distance of about 15 nm to about 25 nm from the first surface of the main pole.

3. The magnetic recording head of claim 1, wherein the negative anisotropic material is a CoFe multilayer structure having a saturation magnetization of about 2.2 T and a uniaxial anisotropy between about −0.5 T and about −1 T.

4. The magnetic recording head of claim 1, wherein the notch comprises a first layer of the negative anisotropic material and a second layer of CoFe.

5. The magnetic recording head of claim 4, wherein the first layer of the negative anisotropic material is disposed in contact with the trailing gap and the second layer of CoFe is disposed adjacent to the first surface of the main pole.

6. The magnetic recording head of claim 4, wherein the first layer of the negative anisotropic material is disposed in contact with the trailing shield and the second layer of CoFe is disposed adjacent to the first surface of the main pole.

7. A magnetic recording device, comprising:
a magnetic recording head, comprising:
a main pole disposed at a media facing surface;
a trailing gap disposed adjacent to and in contact with a first surface of the main pole;
a notch disposed adjacent to and in contact with the trailing gap at the media facing surface, the notch comprising a negative anisotropic magnetic (−Ku) material, wherein the notch is substantially aligned with the first surface of the main pole at the media facing surface; and
a trailing shield coupled to the notch.

8. A magnetic recording head, comprising:
a trailing shield disposed at a media facing surface, the trailing shield comprising a hot seed layer;
a notch coupled to the hot seed layer at the media facing surface, the notch comprising a negative anisotropic magnetic (−Ku) material having a saturation magnetization between about 2.0 T to about 2.5 T, and a uniaxial anisotropy between about −0.5 T to about −1.5 T;
a trailing gap disposed adjacent to the notch, the trailing gap surround a first surface, a second surface, and a third surface of the notch; and
a main pole disposed adjacent to the trailing gap.

9. The magnetic recording head of claim 8, wherein the notch has a first width at the media facing surface less than a second width of the hot seed layer at the media facing surface, the first width of the notch being about 20 nm to about 100 nm.

10. The magnetic recording head of claim 8, wherein the negative anisotropic material is a CoFe multilayer structure comprising alternating layers of Co layers having a thickness between about 0.2 nm about 0.6 nm and Fe layers having a thickness between about 0.4 nm to about 0.8 nm.

11. The magnetic recording head of claim 8, wherein the notch is a multi-layer structure comprising a first layer of the negative anisotropic material and a second layer of CoFe.

12. The magnetic recording head of claim 8, wherein the notch has a first thickness extending from the media facing surface into the magnetic recording head of about 2 nm to about 16 nm, and wherein the hot seed layer has a second thickness extending from the media facing surface into the magnetic recording head substantially equal to the first thickness of the notch.

13. A magnetic recording device, comprising:
a magnetic recording head, comprising:
a trailing shield disposed at a media facing surface, the trailing shield comprising a hot seed layer;
a notch coupled to the hot seed layer at the media facing surface, the notch comprising a negative anisotropic magnetic (−Ku) material having a saturation magnetization between about 2.0 T to about 2.5 T, and a uniaxial anisotropy between about −0.5 T to about −1.5 T;
a trailing gap disposed adjacent to the notch, the trailing gap surround a first surface, a second surface, and a third surface of the notch; and
a main pole disposed adjacent to the trailing gap.

14. A magnetic recording head, comprising:
a leading shield;
a main pole having a first surface disposed at a media facing surface, the main pole comprising a leading side taper recessed a first distance from the media facing surface and a trailing side taper recessed a second distance from the media facing surface;
a trailing gap disposed adjacent to the main pole and the trailing side taper;
a notch disposed adjacent to the trailing gap, the notch comprising a negative anisotropic magnetic (−Ku) material, wherein the notch has a first surface disposed at the media facing surface; and
a trailing shield comprising a hot seed layer, the hot seed layer being coupled to the notch.

15. The magnetic recording head of claim 14, wherein the notch has a first thickness extending from the media facing surface into the magnetic recording head, the first thickness of the notch being less than the second distance the trailing side taper is recessed from the media facing surface, and wherein the hot seed layer has a second thickness extending from the media facing surface into the magnetic recording head, the first thickness of the notch being substantially equal to the second thickness of the hot seed layer.

16. The magnetic recording head of claim 14, wherein the notch has a first width at the media facing surface of about 20 nm to about 100 nm, and wherein the notch is spaced a distance of about 15 nm to about 25 nm from the first surface of the main pole.

17. The magnetic recording head of claim 16, wherein the notch is substantially aligned with the first surface of the main pole and the media facing surface, and wherein the first surface of the main pole has a second width substantially equal to the first width of the notch.

18. The magnetic recording head of claim 14, wherein the notch comprises a first layer of the negative anisotropic material coupled to the hot seed layer and a second layer of CoFe disposed adjacent to the first surface of the main pole, the negative anisotropic material having a saturation magnetization between about 2.0 T to about 2.5 T, and a uniaxial anisotropy between about −0.5 T to about −1.5 T.

19. The magnetic recording head of claim 14, wherein the notch comprises a first layer of the negative anisotropic material disposed adjacent to the first surface of the main pole and a second layer of CoFe coupled to the hot seed layer, the negative anisotropic material having a saturation magnetization between about 2.0 T to about 2.5 T, and a uniaxial anisotropy between about −0.5 T to about −1.5 T.

20. A magnetic recording device, comprising:
a magnetic recording head, comprising:
a leading shield;
a main pole having a first surface disposed at a media facing surface, the main pole comprising a leading side taper recessed a first distance from the media facing surface and a trailing side taper recessed a second distance from the media facing surface;

a trailing gap disposed adjacent to the main pole and the trailing side taper;

a notch disposed adjacent to the trailing gap, the notch comprising a negative anisotropic magnetic (−Ku) material, wherein the notch has a first surface disposed at the media facing surface; and a trailing shield comprising a hot seed layer, the hot seed layer being coupled to the notch.

* * * * *